US009742327B2

(12) United States Patent
Kaidu et al.

(10) Patent No.: US 9,742,327 B2
(45) Date of Patent: Aug. 22, 2017

(54) MOTOR DRIVE CONTROLLER

(71) Applicant: MINEBEA CO., LTD., Kitasaku-Gun, Nagano (JP)

(72) Inventors: Hiroyuki Kaidu, Iwata (JP); Yuji Omura, Shizuoka (JP); Kouji Kebukawa, Kakegawa (JP); Masato Aoki, Iwata (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/151,945

(22) Filed: May 11, 2016

(65) Prior Publication Data
US 2016/0336894 A1 Nov. 17, 2016

(30) Foreign Application Priority Data

May 11, 2015 (JP) ................................ 2015-096677

(51) Int. Cl.
| H02P 6/16 | (2016.01) |
|---|---|
| H02K 33/00 | (2006.01) |
| H02P 6/17 | (2016.01) |
| H02P 6/15 | (2016.01) |
| H02K 29/12 | (2006.01) |

(52) U.S. Cl.
CPC ............. *H02P 6/17* (2016.02); *H02P 6/153* (2016.02); *H02P 6/16* (2013.01); *H02K 29/12* (2013.01)

(58) Field of Classification Search
CPC .. H02P 29/50; H02P 6/17; H02P 27/06; H02P 6/145
USPC ..... 318/400.04, 799, 798, 400.14, 461, 727, 318/600, 400.35; 375/240, 240.16; 369/30.17
See application file for complete search history.

(56) References Cited

U.S. PATENT DOCUMENTS

| 3,643,140 A * | 2/1972 | Allison ................ H02K 29/12 |
|---|---|---|
| | | 318/132 |
| 8,610,386 B2 * | 12/2013 | Asukai .................... H02P 4/00 |
| | | 318/400.09 |

FOREIGN PATENT DOCUMENTS

JP 2011-055651 A 3/2011

* cited by examiner

*Primary Examiner* — Bentsu Ro
*Assistant Examiner* — Zemenay Truneh
(74) *Attorney, Agent, or Firm* — Carrier Blackman & Associates, P.C.; Joseph P. Carrier; Jeffrey T. Gedeon

(57) ABSTRACT

A motor drive controller includes: a motor driver that applies a voltage to each phase of a motor to rotate; a rotational position detector that detects rotational position of the motor and generates rotational position information indicating the rotational position; and a controller that outputs, to the motor driver, driving control signals for repeatedly adjusting an advance angle and a lag angle at energization switching of the each phase of the motor in a prescribed pattern based on the rotational position information generated by the rotational position detector.

10 Claims, 7 Drawing Sheets

MOTOR DRIVE CONTROLLER

BACKGROUND OF THE INVENTION

1. Field of the Invention

The present invention relates to a motor drive controller and a controller for controlling a motor.

2. Description of the Related Art

In common motors driven by alternately energizing their coils, electromagnetic vibration component caused by alternate energization is one of the main causes leading to vibration deterioration. It is required to solve this problem.

The vibration may be avoidable by preventing resonance at a preset range of rotation speed in normal use, for motors that are used to keep rotate in the preset range of rotation speed, but for motors, such as axial fan motor, whose vibration peaks should be suppressed below a certain value at all speeds from stop to maximum speed, the aforesaid practice is not applicable, and alternative solution.

JP-A-2011-055651 discloses a motor controller that suppresses noises due to a vibration of a stator caused by resonance with natural vibration frequency of a motor. The motor controller disclosed in JP-A-2011-055651 is provided with a rotation speed calculator for calculating rotation speeds of the motor and a modulation rate adjuster for adjusting modulation rates of an inverter based on the rotation speeds calculated by the rotation speed calculator and the natural vibration frequency of the stator. This motor controller is designed to prevent the resonance of frequency of higher harmonic frequency components with the natural frequency F of the stator, and to suppress the vibration-based noises of the stator.

The motor controller disclosed in JP-A-2011-055651 needs to adjust the modulation rates of the inverter for each frequency of the PWM signals like 180 degree energization. Therefore, a microcomputer having decent processing power is required for the motor controller, which leads to a higher cost.

SUMMARY OF THE INVENTION

One of objects of the present invention is to provide a motor drive controller and a controller for controlling a motor with a low cost configuration and capable of preventing resonance with the natural frequency of the motor within a prescribed rotation speed range.

According to an illustrative embodiment of the present invention, there is provided a motor drive controller including: a motor driver that applies a voltage to each phase of a motor to rotate; a rotational position detector that detects rotational position of the motor and generates rotational position information indicating the rotational position; and a controller that outputs, to the motor driver, driving control signals for repeatedly adjusting an advance angle and a lag angle at energization switching of the each phase of the motor in a prescribed pattern based on the rotational position information generated by the rotational position detector.

According to another illustrative embodiment of the present invention, there is provided a controller for controlling a motor, the controller being configured to: receive rotational position information indicating rotational position of the motor; and output driving control signals for repeatedly adjusting an advance angle and a lag angle at energization switching of the each phase of the motor in a prescribed pattern based on the rotational position information.

BRIEF DESCRIPTION OF THE DRAWINGS

In the accompanying drawings:

FIGS. 4A-4C are flow charts showing an energization control of the motor drive controller relating to the embodiment, wherein FIG. 4A is the flow chart of a main flow, and wherein FIG. 4B and FIG. 4C are the flow chart of subroutines of energization switching;

DETAILED DESCRIPTION

Hereinafter, embodiments of the present invention will be described in detail with reference to the accompanying drawings and equations.

Figure 1:
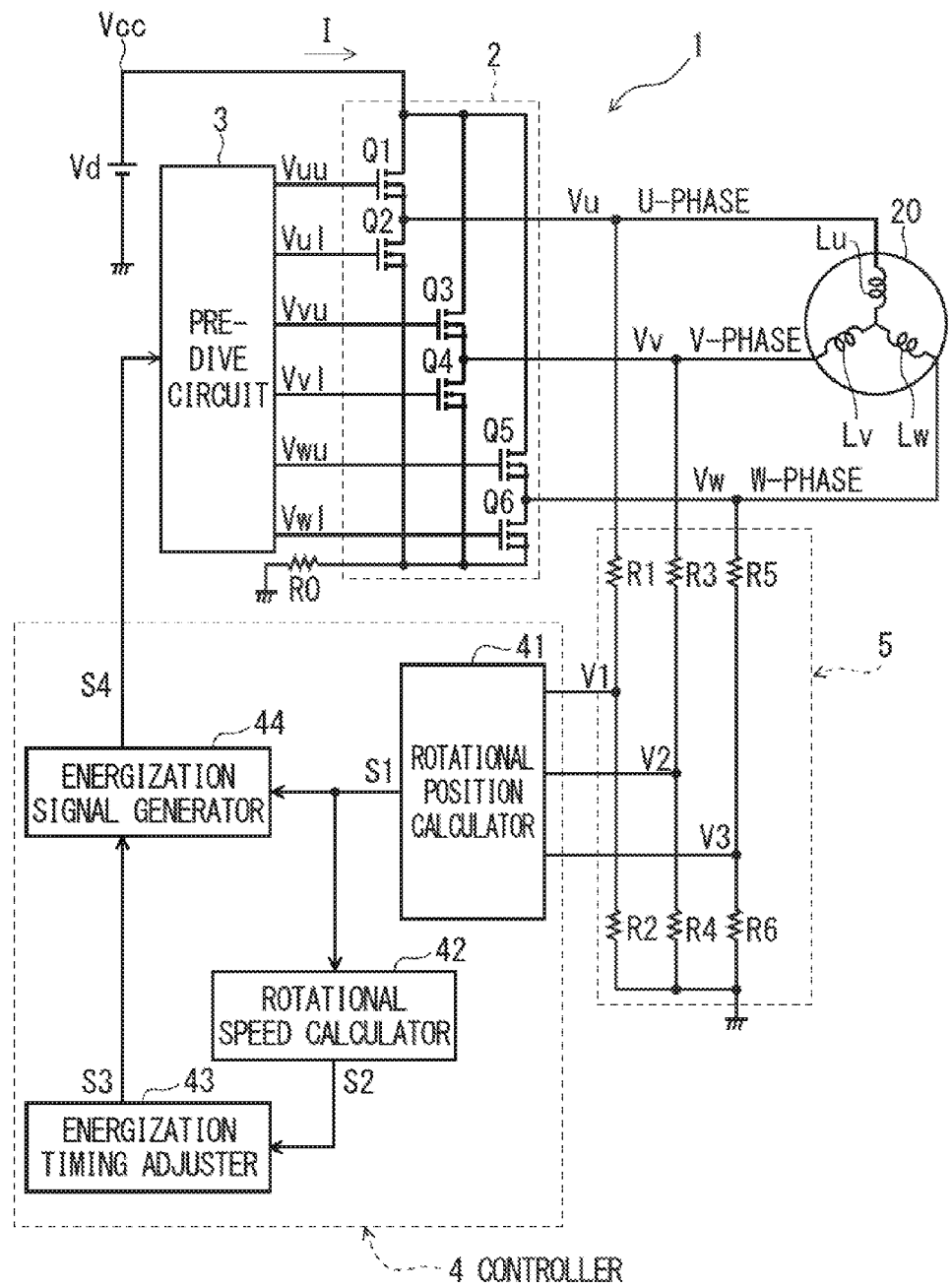
FIG. 1 is a block diagram showing a circuit configuration of a motor drive controller relating to an embodiment of the present disclosure.

FIG. 1 is a block diagram showing a circuit configuration of a drive controller 1 for a motor 20 according to an embodiment.

As shown in FIG. 1, the motor 20 according to the embodiment is a three-phase brushless DC motor having phase coils Lu, Lv and Lw, and a rotor (not shown). One ends of the coils Lu, Lv, and Lw are Y-connected. The other ends of these coils Lu, Lv, and Lw are respectively connected to the U-phase output, V-phase output and W-phase output of an inverter circuit 2. The motor 20 is driven to rotate by the inverter circuit 2 supplying three-phase currents.

The drive controller 1 of the motor 20 (an example of the motor drive controller) is provided with an inverter circuit 2 and a pre-drive circuit 3 (an example of the motor driver), which drives the motor 20, and a rotational position detecting circuit 5 that detects the rotational position of the motor to generate rotational position information. The drive controller 1 is also provided with a controller 4 that outputs the driving control signals S4 (described later) to the motor driver.

The drive controller 1 is connected to a DC power supply Vd and connected to the motor 20 with three-phase wirings of U-phase wiring, V-phase wiring and W-phase wiring. The drive controller 1 applies driving voltage to the motor 20 to control the rotation of the motor 20. Inter-terminal voltages Vu, Vv and Vw are applied respectively to the U-phase, V-phase and W-phase.

The motor driver is configured by the inverter circuit 2 and the pre-drive circuit 3. The DC power supply Vd applies a voltage Vcc to the motor driver to provide electricity. The motor driver receives electric power supplied from the DC power supply Vd, and supplies the driving currents to the coils Lu, Lv and Lw of the U-phase, V-phase and W-phase of the motor 20 to rotate according to the driving control signals S4 from the controller 4. The motor driver drives the motor 20 in a sine wave drive method.

The inverter circuit 2 is connected to the pre-drive circuit 3 (a part of the motor driver) and the respective phase of the coils Lu, Lv, and Lw of the motor 20. The inverter circuit 2 energizes the respective phase of coils Lu, Lv, and Lw of the motor 20 in accordance with drive signals Vuu-Vwl of the pre-drive circuit 3.

The inverter circuit 2 has U-phase switching leg at which switching elements Q1 and Q2 are connected in series, V-phase switching leg at which switching elements Q3 and Q4 are connected in series, and W-phase switching leg at which switching elements Q5 and Q6 are connected in series. These switching elements Q1 to Q6, for example, are Field Effect Transistors (FET). The inverter circuit 2 is connected to the DC power supply Vd and further connected to a resistor R0.

The switching legs of U-phase, V-phase, and W-phase respectively are connected to the switching elements Q1, Q3 and Q5 at their upper arm sides and connected to the switching elements Q2, Q4, and Q6 at their lower arm sides. The switching elements Q1, Q3 and Q5 have their drain terminals respectively connected to the positive pole of the DC power supply Vd. The switching elements Q1, Q3, and Q5 have their source terminals respectively connected to the drain terminals of the switching elements Q2, Q4 and Q6, and output the AC signals of U-phase, V-phase, and W-phase respectively from their connection points. The source terminals of the switching elements Q2, Q4 and Q6 are respectively connected to the ground (the negative pole of the DC power supply Vd) via the resistor R0. The gate terminals of the switching elements Q1-Q6 are connected respectively to the pre-drive circuit 3.

The inverter circuit 2 receives electric power supplied from the DC power supply Vd, and enables three-phase AC currents to flow through the U-phase, V-phase and W-phase wirings of the motor 20 as the pre-drive circuit 3 receives the drive signals Vuu to Vwl.

The pre-drive circuit 3 (a part of the motor driver) serves as the motor driver in combination with the inverter circuit 2 connected thereto and is connected with the controller 4. The pre-drive circuit 3, for example, has 6 gate drive circuits to generate the drive signals Vuu to Vwl for driving the inverter circuit 2.

The controller 4 includes a rotational position calculator 41, a rotation speed calculator 42, an energization timing adjuster 43, and an energization signal generator 44 and is implemented as a microcomputer chip. The controller 4 may be implemented as software that runs on a processor.

The rotational position calculator 41 receives rotational position information (phase voltages V1, V2, and V3) of the rotor that is detected by a rotational position detecting circuit 5, which includes resistors R1 to R6, and generates corresponding position detection signals S1. The rotational position detecting circuit 5, in this embodiment, detects the rotational position by detecting back electromotive voltage of each phase. The method for detecting the rotational position is not limited to the configuration in this embodiment, in which the rotational position is detected by detecting back electromotive voltage. The rotational position may be detected by usage of various sensors, for example, a Hall sensor.

The rotation speed calculator 42 calculates rotation speed based on the position detection signals S1 and generates speed information S2.

The energization timing adjuster 43 generates energization timing signals S3 for advance angle and lag angle adjustment within the prescribed rotation speed range based on the speed information S2 output by the rotation speed calculator 42.

The energization signal generator 44 receives the position detection signals S1 and the energization timing signals S3 to generate the driving control signals S4.

The controller 4 outputs to the motor driver the driving control signals S4 for repeated adjustment of the advance angle and the lag angle at energization switching in a prescribed pattern according to the rotational position information (phase voltages V1, V2 and V3) detected by the rotational position detector 5.

In the specification, the term "advance angle adjustment" refers to shortening energization period and the term "lag angle adjustment" refers to extending energization period.

The controller 4 performs energization switching setting described below.

When the motor 20 is rotating within a prescribed rotation speed range, the controller 4 repeatedly adjusts the lead angle and the lag angle at energization switching in a prescribed pattern. In the present disclosure, each rotation of the rotor is considered as a single cycle, and an electromagnetic vibration component that occurs once during each cycle is considered to be a primary component. Electromagnetic vibration components corresponding to n-times of energization switching per rotation of the rotor are defined as nth-order component. The prescribed rotational speed range includes the range where the nth-order component is resonant with the natural resonant frequency of the motor 20.

The controller 4 outputs the driving control signals S4 to reduce the supply currents of the nth-order component corresponding to n-times of energization switching per rotation of the rotor.

The controller 4 performs control in such a manner that the motor driver alternates the advance angle adjustment and the lag angle adjustment at energization switching. As a result, in the drive controller 1, with the increasing of the supply current of the (n/2)th-order component, the supply current of the nth-order component decreases.

Hereinafter, the operation of the motor drive controller configured as illustrated above will be described.

Firstly, the basic concept of the present disclosure will be described.

Generally, in order to efficiently drive a motor, a uniformly consistent current waveform without unevenness is desired. However, in a case where the current waveform is uniformly consistent without unevenness, energization timing should also be tidily set. As a result, a certain rotational order component will be produced.

For example, in case of a 6-pole 9-slot brushless motor, there are 18 times of energization switching per rotation. Therefore, when the current waveform is analyzed with Fast Fourier Transform (FFT), only an 18th-order component is ideally produced. The 18th-order component will be resonant with the natural frequency of the motor to become a greater electromagnetic vibration component.

Here, the number of times of energization switching per rotation is obtained by dividing the number of poles by 2 and then multiplying the result with the number of times of energization switching per pole (e.g., 6 times in case of 3 phases).

The present disclosure proposes to repeatedly adjust the advance angle and the lag angle at energization switching in a prescribed pattern within the specified rotation speed range. Thus, the electromagnetic vibration component can be suppressed by transforming, to another order component, the nth-order component corresponding to the n times of energization switching per rotation that may become the main cause of the electromagnetic vibration component.

For example, in a case of a 6-pole 9-slot brushless motor, the energization waveform is controlled at each energization switching point with the specific rotation speed range where the 18th-order component is resonant with the natural frequency of the motor in such a manner than the advance angle adjustment and the lag angle adjustment are alternated. Thus, the supply current increases for the 9th-order component which is the half frequency of the 18th-order component. The supply current of the 9th-order component is increased, but on the other hand, the supply current of the 18th-order component is suppressed. Thus, the resonance with the natural frequency of the motor may be avoided.

Hereinafter, the operation of the motor drive controller 1 according to the embodiment will be described.

Figure 2:
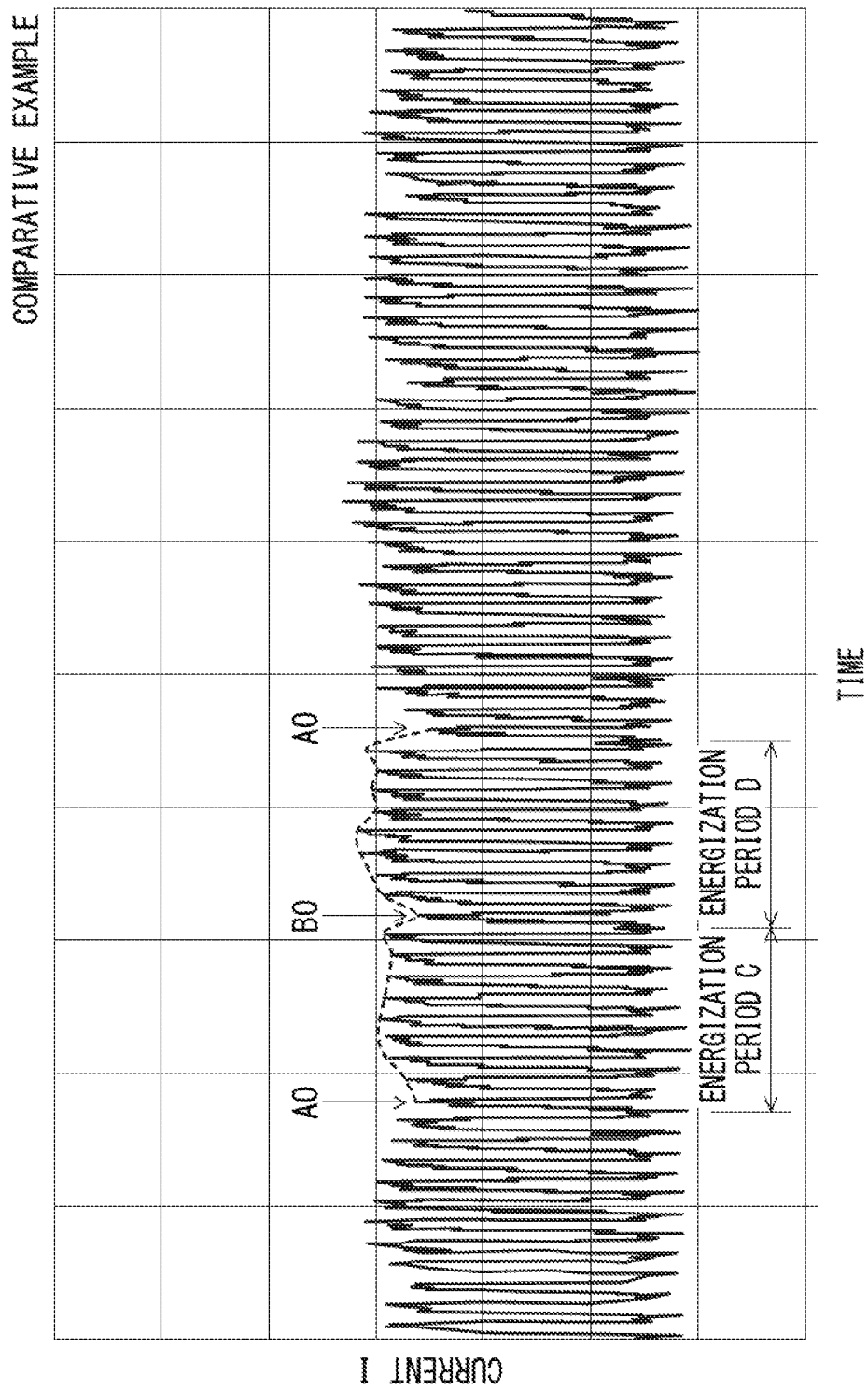
FIG. 2 is a supply current waveform of a 6-pole 9-slot brushless motor relating to a comparative example.

FIG. 2 is a supply current waveform of a 6-pole 9-slot brushless motor according to a comparative example. In FIG. 2, the vertical axis represents the current waveform of the current I shown in FIG. 1, and the horizontal axis represents time.

In FIG. 2, the symbols A0 and B0 represent the energization switching points of the 6-pole 9-slot brushless motor. FIG. 2 shows a waveform of supply current applied with cyclic energization switching.

As shown in FIG. 2, the energization period C between the energization switching points A0 and B0 and the energization period D between the energization switching points B0 and A0 are substantially same in length. In addition, the dotted line in FIG. 2 represents envelope curve linking the maximum amplitudes of the current waveform, with the same current waveform repeated at each energization switching point.

Figure 3:
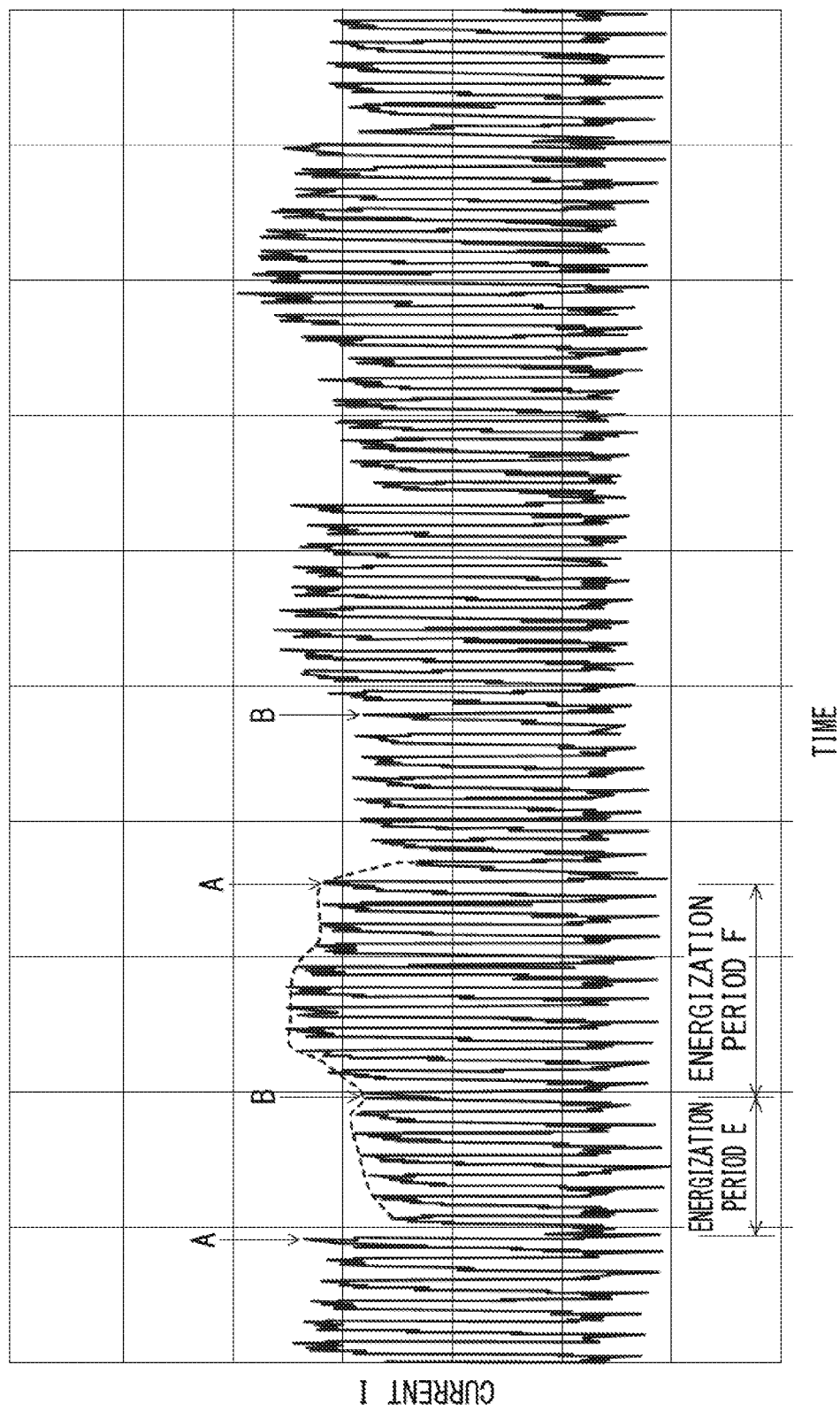
FIG. 3 is a supply current waveform of the motor drive controller according to the embodiment.

FIG. 3 is a supply current waveform of the motor drive controller 1 according to the embodiment, which corresponds to the supply current waveform of the comparative example in FIG. 2. In FIG. 3, the vertical axis represents the current waveform of the current I shown in FIG. 1, and the horizontal axis represents time.

In FIG. 3, the symbols A and B represents energization switching points according to the setting based on advance angle and the lag angle according to the embodiment.

In the embodiment, the supply current of the (n/2)th-order component increases and the supply current of the nth-order component decreases. In this example, in order to reduce the 18th-order component, the energization switching to include 9th-order component, for example, is employed.

In order to include the 9th-order component, the energization switching is performed to increase the current amplitude once every two times of energization switching. As an example, the advance angle and the lag angle are repeatedly adjusted at energization switching in a prescribed pattern (e.g. alternately). Particularly, controls are performed in the following manners.

(1) As shown in FIG. 3, at the energization switching point A, a lag angle control is performed to switch energization at a later timing than a normal timing.

(2) As shown in FIG. 3, at the energization switching point B, an advance angle control is performed to switch energization at an earlier timing than a normal timing.

(3) The advance angle and lag angle setting of the above (1) and (2) are set to repeat in a prescribed pattern (in this case alternately). That is to say, the amount of the lag angle adjustment at the energization switching point A of (1) is balanced out by the amount of the advance angle adjustment at the next energization switching point B. Thus, in relation to the energization switching per rotation of the rotor, the advance angle adjustment and the lag angle adjustment is balanced out.

For example, as shown in FIG. 3, the energization period E between the energization switching points A and B and the energization period F between the energization switching points B and A are different in length. The energization period E is shorter than a normal energization period while the energization period F is longer than the normal energization period. The sum of the energization periods E and F are identical with that of two normal energization periods, but in each rotation of the rotor, the advance angle adjustment and the lag angle adjustment is balanced out.

The lag angle adjustment control at low side energization switching and the advance angle adjustment control at high side energization switching are just an example, and reversing the low side and high side energization switching may still work. In a case where the low side and high side energization is reversed, the advance angle adjustment control is performed at the low side energization switching, and the lag angle adjustment control is performed at high side energization switching.

In a pattern that repeatedly alternates the aforesaid advance angle adjustment and lag angle adjustment, the supply current of the (n/2)th-order component (in this case, 9th-order component) increases, and the supply current of the nth-order component (in this case, 18th-order component) corresponding to the n times of energization switching per rotation of the rotor decreases. Further, the advance angle adjustment and the lag angle adjustment may be set to a prescribed pattern, which can also include non-alternating patterns. For example, the aforesaid advance angle and lag angle settings may not be performed for a certain number of times of energization switching after performing the advance angle and lag angle settings, and thereafter, the advance angle and lag angle settings may be performed for the next energization switching after the certain number of times.

The dotted line in FIG. 3 represents the envelope curve linking the maximum amplitudes of the current wave. As shown by the envelope curve, compared with those of normal energization switching, the amplitude of the current increases at the energization switching point A and decreases at the energization switching point B. As a result, there is a longer cycle between the energization periods E and F due to adjustment, so the cycle per rotation may be set to be halved.

Figure 4A:
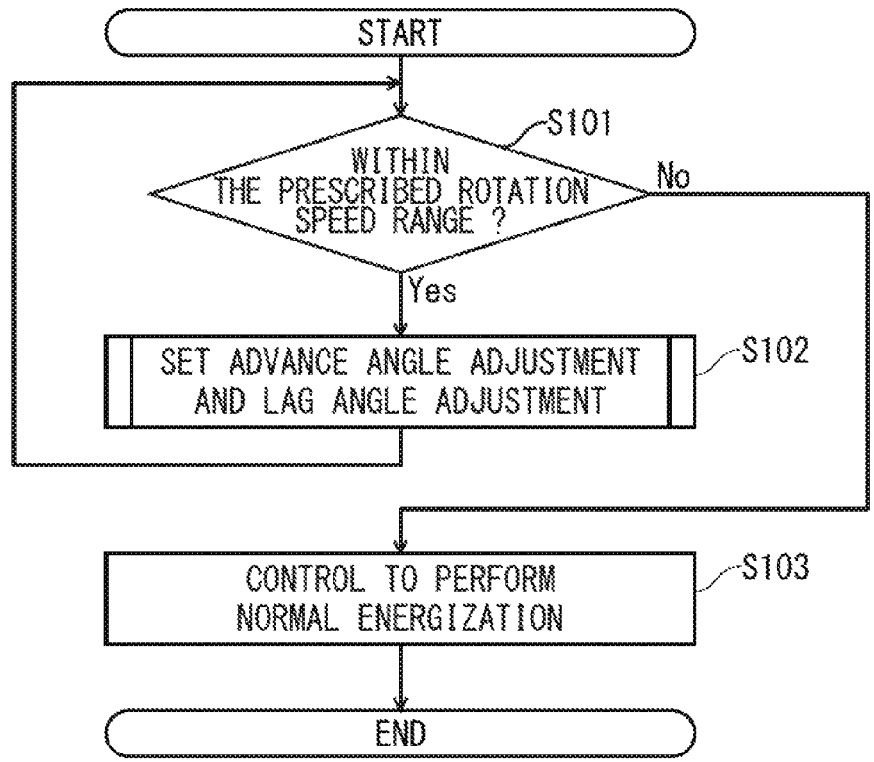
Figure 4B:
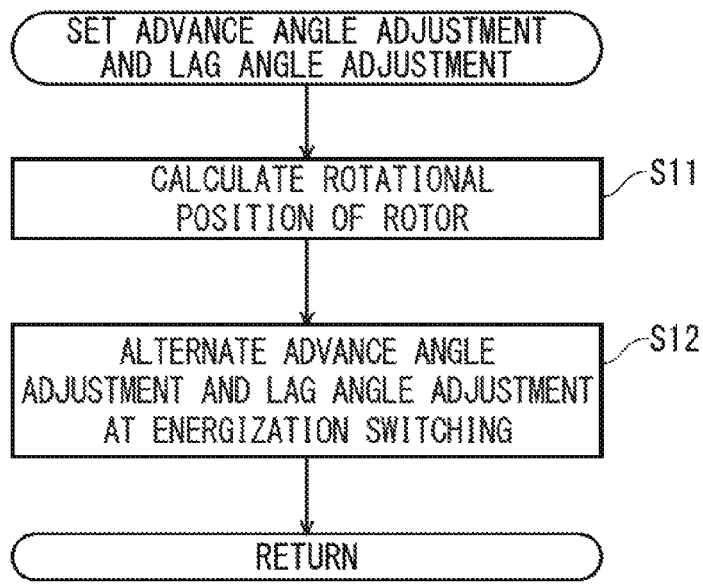
Figure 4C:
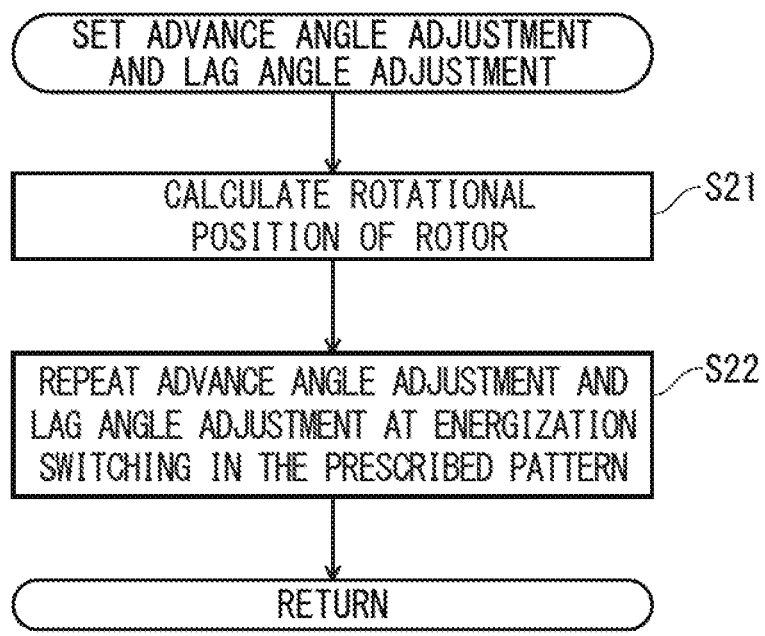

FIGS. 4A-4C are flow charts showing the energization control of the motor drive controller relating to the embodiment, wherein FIG. 4A is a main flow, FIGS. 4B and 4C are subroutines of step S102 shown in FIG. 4A. The flow of FIG. 4A-4C is repeatedly performed by the controller 4 (shown in FIG. 1) at every prescribed timing.

In step S101, the controller 4 determines if the motor 20 (see FIG. 1) is in the prescribed rotation speed range. The prescribed rotation speed range includes the range where the nth-order component corresponding to the n times of energization switching per rotation of the rotor is resonant with the natural resonance frequency of the motor 20. The position detection signal S1 corresponding to the rotational position information (phase voltages V1, V2 and V3) output from the rotational position detector 5 is generated with the rotational position calculator 41 (see FIG. 1). The rotation speed calculator 42 calculates the rotation speed based on the position detection signal S1 and generates the speed information S2 for calculating the rotation speed of the motor 20.

When the motor 20 is rotating at a rotation speed that is within a prescribed rotation speed range (YES in step S101), the controller 4 sets the advance angle and the lag angle in step S102 for suppressing the electromagnetic vibration component of the natural frequency resonance of the motor 20. Particularly, in the energization timing adjuster 43, energization timing signals S3 is generated for adjusting the advance angle and the lag angle while the motor 20 is rotating at the rotation speed that is within the prescribed rotation speed range based on the speed information S2 output by the rotational speed calculator 42. The energization signal generator 44 receives the position detection signals S1 and the energization timing signals S3 to generate the driving control signals S4. The advance angle adjustment and the lag angle adjustment in step S102 are set to compulsorily repeat the advance angle adjustment and the lag angle adjustment in a prescribed pattern while the motor 20 is rotating at the rotation speed that is within the prescribed rotation speed range. Details will be described later. The process returns to step S101 after the advance angle adjustment and the lag angle adjustment are set. While the motor 20 is rotating at the rotation speed that is within a prescribed rotation speed range (YES in step S101), the process of the advance angle adjustment and the lag angle adjustment settings in step S102 is repeated.

On the other hand, when the motor 20 is not rotating at a rotation speed that is within the prescribed rotation speed range in step S101 (No in step S101), the controller 4 skips the advance angle adjustment and the lag angle adjustment settings in step S102 and proceeds to step S103.

In step S103, the controller 4 performs normal energization control and ends this process.

The above-mentioned advance angle adjustment and the lag angle adjustment settings will now be described.

The advance angle adjustment and the lag angle adjustment settings repeatedly adjust the advance angle and the lag angle at energization switching in a prescribed pattern. Following examples are described.

EXAMPLE 1

As shown in FIG. 4B, the rotational position calculator 41 calculates the rotational position of the rotor in step S11.

In step S12, the energization timing adjuster 43 alternates the lead angle adjustment and the lag angle adjustment at energization switching based on the rotational position of the rotor.

Thus, the supply current of the (n/2)th-order component may be increased and the supply current of the nth-order component may be decreased. For example, the supply current of the 9th-order component is increased, and the supply current of the 18th-order component is decreased.

EXAMPLE 2

As shown in FIG. 4C, the rotational position calculator 41 calculates the rotational position of the rotor in step S21.

In step S22, the energization timing adjuster 43 repeats the advance angle adjustment and the lag angle adjustment at energization switching in a prescribed pattern.

Thus, the supply current of the nth-order component corresponding to the n times of energization switching per rotation of the rotor may be decreased.

Figure 5:
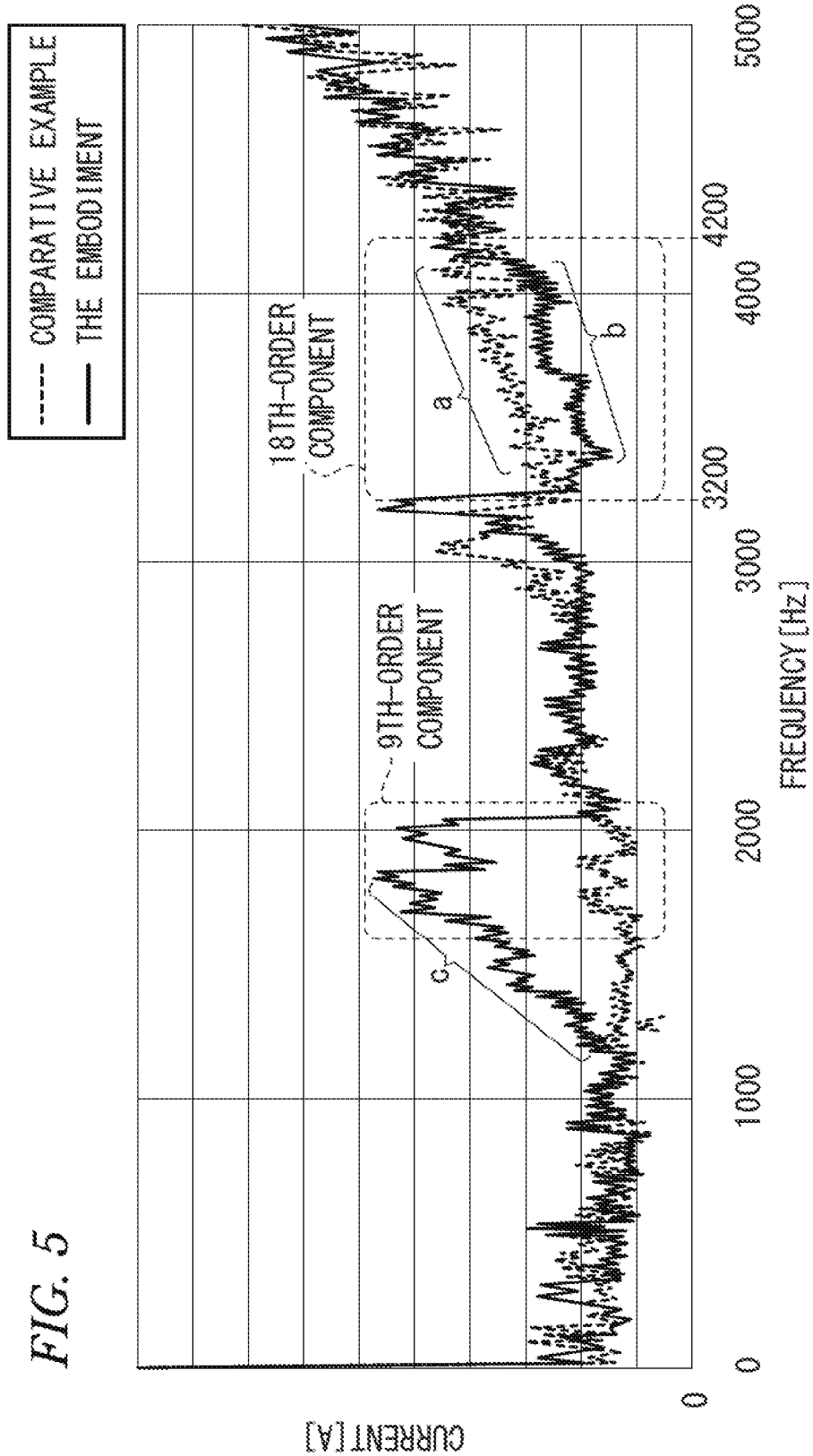
FIG. 5 is a current-frequency characteristics graph of the motor drive controller according to the embodiment.

FIG. 5 is a current-frequency characteristics graph of the motor drive controller according to the embodiment. FIG. 5 is a FFT curve of the current waveform obtained by sweeping the rotation speeds in a 6-pole 9-slot brushless motor, where the vertical axis represents the current value of the current I shown in FIG. 1 and the horizontal axis represents frequency. As shown in FIG. 5, the solid line waveform represents the current waveform according to the embodiment; the dotted line waveform represents the current waveform according to the comparative example.

As shown by symbol "a" in FIG. 5, an 18-order component generates accompanying with 18 times of energization switching during each rotation of the rotor of the comparative example. As described above, the 18th-order component becomes a greater electromagnetic vibration component by being resonant with the natural frequency of the motor 20.

In the embodiment, the 9th-order component is increased and the 18th-order component is decreased by alternating the advance angle adjustment and the lag angle adjustment at energization switching.

When the rotation speed of the motor 20 changes, the resonance with the natural frequency of the motor 20 takes place within a frequency range equivalent to the nth-order component corresponding to the n-number of times of energization switching, within the prescribed rotation speed range. In the embodiment, resonance may be avoided under the nth-order component by suppressing the supply current within its frequency range.

As shown by the region circled by the dotted line in FIG. 5, the current value is suppressed within a frequency range (3200 Hz-4200 Hz) equivalent to the 18th-order component (see symbol "b" in FIG. 5) in the embodiment. In FIG. 5, the resonance of the 18th-order component with the natural frequency of the motor 20 may be avoided through energization control (advance angle adjustment and lag angle adjustment settings) within the prescribed rotation speed range (including the rotation speed range 10667 rpm-14000 rpm corresponding to the frequency range described above).

However, as shown by symbol "c" in FIG. 5, in the embodiment, the 9th-order component increases. However, the 9th-order component will not produce any electromagnetic vibration component as it is not resonant with the natural frequency of the motor 20. Furthermore, the frequency range near the 9th-order component may have no impact on the system as the current value is also small.

The reason why the 18th-order component corresponds to a rotation speed range of 10667 rpm 14000 rpm in the embodiment will be described.

It is assumed that the natural frequency of the motor 20 is known by being measured. A greater electromagnetic vibration component is produced by being resonant with this natural frequency. In the case shown in FIG. 5, the resonance point (electromagnetic vibration component) exists between 3200 Hz and 4200 Hz. These frequencies are converted to rotation speeds respectively, i.e. 3200 [Hz]×60÷18=10667 rpm, and 4200 [Hz]×60÷18=14000 rpm.

That is, for the rotation speed range of the frequency range of a nth-order component corresponding to f1 [Hz]~f2 [Hz], its lower limit Rmin [rpm] and the upper limit Rmax [rpm] are respectively (f1×60÷n) rpm and (f2×60÷n) rpm.

Then, the prescribed rotation speed range is set to include at least the rotation speed range corresponding to the nth-order component, i.e. the range where the nth-order component is resonant with the natural resonance frequency of the motor 20.

Figure 6:
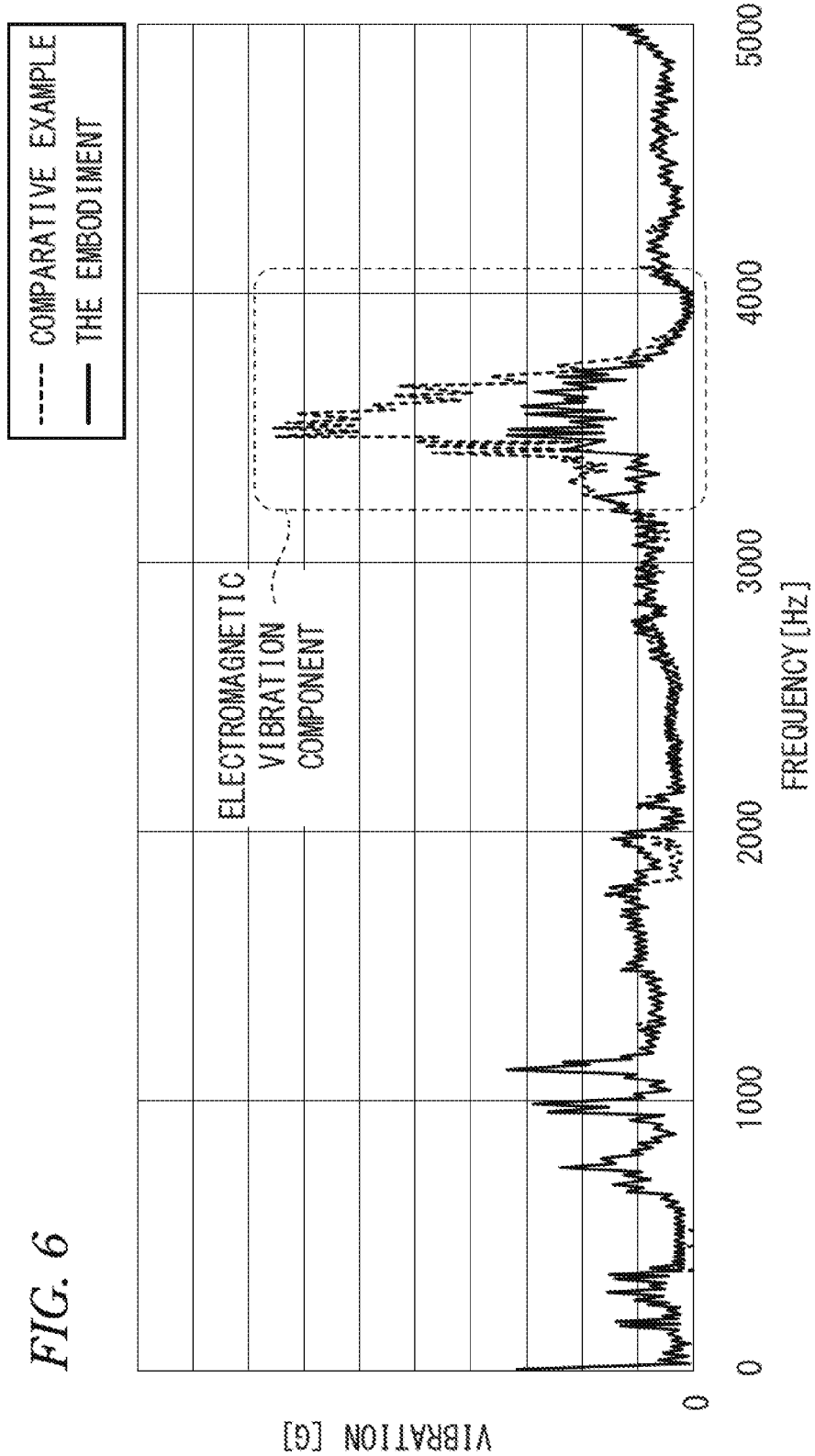
FIG. 6 is a vibration-frequency characteristics graph of the motor drive controller according to the embodiment.

FIG. 6 is a vibration-frequency characteristics graph of the motor drive controller relating to the embodiment. FIG. 6 shows how the vibration value (vibration component peak) changes in relation to the frequency of the 6-pole 9-slot brushless motor in the rotational direction. In FIG. 6, the vertical axis represents the vibration value, and the horizontal axis represents frequency. In FIG. 6, the solid line waveform represents the vibration value of the embodiment, and the dotted line waveform represents the vibration value of the comparative example.

Within the frequency range of the electromagnetic vibration component corresponding to the 18th-order component, which is circled by the dotted line in FIG. 6, significant vibration reduction may be achieved. For example, the vibration peak may be reduced by more than 50%.

As described above, the drive controller 1 of the motor 20 in the embodiment is provided with a motor driver that applies a voltage to each phase of the motor 20 to rotate, a rotational position detector 5 that detects the rotational position of the motor 20 and generates rotational position information, and a controller 4 that outputs to the motor driver the driving control signals S4 for repeated adjustment of the advance angle and the lag angle at energization switching in a prescribed pattern according to the rotational position information (phase voltages V1, V2 and V3) being detected. When the motor 20 rotates at a rotation speed that is within a prescribed rotation speed range, the controller 4 repeatedly adjusts the advance angle and the lag angle at energization switching in a prescribed pattern. The controller 4 outputs the driving control signals S4 to reduce the supply currents of the nth-order component when the number of times of energization switching per rotor revolution is "n".

According to this configuration, there is provided a motor drive controller with a low cost configuration and capability to prevent resonance with the natural frequency of the motor while the motor is rotating at a rotation speed that is within a prescribed rotation speed range, and with capability to reduce the vibration and accompanying noises of the motor.

Further, the drive controller 1 according to the embodiment is configured to adjust the energization periods at energization switching without relying on modulation rates as the technique described in JP-A-2011-055651, the adjustment may be achieved by usage of low cost microcomputers (controller).

Further, in the embodiment, the controller 4 performs control in such a manner that the motor driver alternates the advance angle adjustment and the lag angle adjustment at energization switching, thus increasing the supply current of the (n/2)th-order component and decreasing the supply current of the nth-order component. That is, the current value of the nth-order component corresponding to the n-number of times of energization per rotation of the motor may be suppressed by performing the advance angle adjustment and the lag angle adjustment control at every energization point alternately within the prescribed rotation speed range. As a result, the resonance with the natural frequency of the motor within a prescribed rotation speed range may be avoided, and the vibration and accompanying noises of the motor may be reduced.

The present disclosure is not limited to the above-described embodiments. Modification to the embodiment may be implemented, for example, in the following manners (a)-(g).

(a) The prescribed rotation speed range may be set appropriately based on the resonance point of the natural frequency of the motor to be used and may not be uniquely defined. The technique proposed by the present disclosure is to forcibly repeat the advance angle adjustment and the lag angle adjustment at energization switching in a prescribed pattern. Therefore, any rotation speed range may be applicable.

(b) Each component of the drive controller or at least a part of them may be implemented as software and not as hardware.

(c) In the embodiment, although a 6-pole 9-slot brushless motor is used as an example to describe the motor 20, the number of poles, slots, and the type of motor may not particularly be limited. In addition, the number of phases of the motor 20 may not particularly be limited.

(d) The rotational position detector is not limited to the configuration according to the embodiment (back electromotive voltage detecting circuit). For example, the position detecting circuit may be a Hall sensor.

(e) At least a part of the drive controller may also be integrated circuits (IC).

(f) The circuit block configuration of the drive controller shown in FIG. 1 is merely an example of available configuration, and the drive controller is not limited to the configuration shown in FIG. 1.

(g) The control flow shown in FIG. 5 is merely an example of available flow, and the control flow is not limited to the flow shown in FIG. 5. For example, other process may be inserted between the steps shown in FIG. 5.

As described with reference to the embodiments, according to the present invention, there is provided a motor drive controller and a controller for controlling a motor with a low cost configuration and the ability to prevent resonance with the natural frequency of the motor within a prescribed rotation speed range.

What is claimed is:

1. A motor drive controller comprising:
   a motor driver that applies a voltage to each phase of a motor to rotate;
   a rotational position detector that detects rotational position of the motor and generates rotational position information indicating the rotational position; and
   a processor that outputs, to the motor driver, driving control signals for repeatedly adjusting an advance angle and a lag angle at energization switching of the each phase of the motor in a prescribed pattern based on the rotational position information generated by the rotational position detector,
   wherein the processor repeatedly adjusts the advance angle and the lag angle at energization switching in a prescribed pattern while the motor is rotating at a rotation speed that is within a prescribed rotation speed range,
   wherein the prescribed rotation speed range includes a range where a nth-order component corresponding to a n-number of times of the energization switching per rotation of the rotor is resonant with a natural resonance frequency of the motor, and
   wherein the processor increases an (n/2)th-order component of a supply current and decreases the nth-order component of the supply current.

2. The motor drive controller according to claim 1,
   wherein the processor outputs the driving control signals to reduce the supply currents of an nth-order component.

3. The motor drive controller according to claim 1,
   wherein the processor controls the motor driver to alternatively adjust the advance angle and the lag angle at the energization switching.

4. The motor drive controller according to claim 1,
   wherein the processor is configured to function as:
   a rotational position calculator that calculates the rotation speed based on the rotational position information;
   an energization timing adjuster that generates energization timing signals for adjusting the advance angle and the lag angle at the energization switching based on the rotational speed information output by the rotational position calculator; and
   an energization signal generator that receives the rotational position information and the energization timing signals to generate the driving control signals.

5. A controller for controlling a motor, comprising:

a processor configured to:

receive rotational position information indicating rotational position of the motor; and output driving control signals for repeatedly adjusting an advance angle and a lag angle at energization switching of the each phase of the motor in a prescribed pattern based on the rotational position information, wherein the processor repeatedly adjusts the advance angle and the lag angle at energization switching in a prescribed pattern while the motor is rotating at a rotation speed that is within a prescribed rotation speed range, wherein the prescribed rotation speed range includes a range where a nth-order component corresponding to a n-number of times of the energization switching per rotation of the rotor is resonant with a natural resonance frequency of the motor, and wherein the processor controls the motor driver to alternatively adjust the advance angle and the lag angle at the energization switching.

6. The controller according to claim 5, wherein the processor outputs the driving control signals to reduce the supply currents of an nth-order component.

7. The controller according to claim 5, wherein the processor increases an (n/2)th-order component of a supply current and decreases the nth-order component of the supply current.

8. The controller according to claim 5, wherein the processor controls the motor driver to alternatively adjust the advance angle and the lag angle at the energization switching.

9. The controller according to claim 5, wherein the processor is further configured to function as:

a rotational position calculator that calculates the rotation speed based on the rotational position information;

an energization timing adjuster that generates energization timing signals for adjusting the advance angle and the lag angle at the energization switching based on the rotational speed information output by the rotational position calculator; and an energization signal generator that receives the rotational position information and the energization timing signals to generate the driving control signals.

10. A motor drive controller comprising:

a motor driver that applies a voltage to each phase of a motor to rotate;

a rotational position detector that detects rotational position of the motor and generates rotational position information indicating the rotational position; and a processor that outputs, to the motor driver, driving control signals for repeatedly adjusting an advance angle and a lag angle at energization switching of the each phase of the motor in a prescribed pattern based on the rotational position information generated by the rotational position detector, wherein the processor repeatedly adjusts the advance angle and the lag angle at energization switching in a prescribed pattern while the motor is rotating at a rotation speed that is within a prescribed rotation speed range, wherein the prescribed rotation speed range includes a range where a nth-order component corresponding to a n-number of times of the energization switching per rotation of the rotor is resonant with a natural resonance frequency of the motor, and wherein the processor controls the motor driver to alternatively adjust the advance angle and the lag angle at the energization switching.

* * * * *